(12) United States Patent
Studtmann

(10) Patent No.: US 7,630,319 B1
(45) Date of Patent: Dec. 8, 2009

(54) METHOD AND SYSTEM FOR DECODING TOKENIZED SESSION INITIATED PROTOCOL PACKETS

(75) Inventor: Joel Mark Studtmann, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 806 days.

(21) Appl. No.: 10/881,984

(22) Filed: Jun. 30, 2004

(51) Int. Cl.
G01R 31/08 (2006.01)
H04L 12/28 (2006.01)
H04M 7/00 (2006.01)
G06F 15/16 (2006.01)

(52) U.S. Cl. .................. 370/250; 370/389; 370/392; 379/220.01; 379/221.01; 709/227; 709/247

(58) Field of Classification Search ............... 370/352, 370/389, 401, 328; 709/217, 218, 229, 230
See application file for complete search history.

(56) References Cited

U.S. PATENT DOCUMENTS

| | | | | |
|---|---|---|---|---|
| 6,608,817 B1* | 8/2003 | Ivory | ................... | 370/250 |
| 6,735,621 B1* | 5/2004 | Yoakum et al. | ............ | 709/218 |
| 6,807,173 B1* | 10/2004 | Lee et al. | ................... | 370/389 |
| 7,123,693 B2* | 10/2006 | Nelson et al. | ................ | 379/45 |
| 7,412,541 B1* | 8/2008 | Stadler et al. | ............... | 709/247 |
| 2003/0023877 A1* | 1/2003 | Luther et al. | ................ | 713/201 |
| 2003/0217109 A1* | 11/2003 | Ordille et al. | ............... | 709/206 |
| 2003/0231647 A1* | 12/2003 | Petrovykh | ................... | 370/429 |
| 2004/0148395 A1* | 7/2004 | Schulzrinne | ................ | 709/227 |
| 2004/0153667 A1* | 8/2004 | Kastelewicz et al. | ........ | 713/201 |
| 2004/0162032 A1* | 8/2004 | Li et al. | ........................ | 455/72 |
| 2004/0180646 A1* | 9/2004 | Donley et al. | ............... | 455/411 |
| 2004/0202303 A1* | 10/2004 | Costa-Requena et al. | ........ | 379/205.01 |
| 2005/0132075 A1* | 6/2005 | Creamer et al. | ............. | 709/229 |
| 2005/0215267 A1* | 9/2005 | Cartmell | .................. | 455/456.1 |

FOREIGN PATENT DOCUMENTS

WO   WO 2005/011175 A2 *  7/2004   ................. 709/229

OTHER PUBLICATIONS

Handley, M. SDP: Session Description Protocol, Apr. 1998.*
Rosenberg, J. SIP: Session Initiated Protocol, Jun. 2002.*

* cited by examiner

Primary Examiner—Huy D. Vu
Assistant Examiner—Brandon Renner

(57) ABSTRACT

The present invention relates to a method of decoding tokenized Session Initiated Protocol. A token from a tokenized Session Initiated Protocol packet is received. A decoding table is accessed and the corresponding entry for the token is determined. The token is executed according to the corresponding entry. This may be done for all tokens in a tokenized Session Initiated Packet. Once the tokens have been executed according to their entries in a decoding table, the decoded tokenized Session Initiated Protocol packet is provided.

10 Claims, 6 Drawing Sheets

Table length is 293 bytes.
First token should be 62
String table entry 0 is "tzhou08 "
String table entry 1 is "68.24.66.85 "
String table entry 2 is "68.28.83.82 "
String table entry 3 is "a.3ltd5usNcLN8qjYcifhQ~~77 "
String table entry 4 is "68.28.82.30 "
String table entry 5 is "9135689767 "
String table entry 6 is "ccook02 "
String table entry 7 is "ptt.sprintpcs.com@ "
String table entry 8 is "1126038019 "
String table entry 9 is "8163059757 "
String table entry 10 is "10.25.40.52 "
String table entry 11 is "239236663-1052161634.1570 "
String table entry 12 is "192.168.0.120 "
String table entry 13 is "App-Id "
String table entry 14 is "10.25.40.65 "
String table entry 15 is "Winphoria 10.25.40.65 2322 "
String table entry 16 is "97 0 "
String table entry 17 is "10 "
String table entry 18 is "20 "
String table entry 19 is "150 "
String table entry 20 is "40 "
String table entry 21 is "1 "

Tokens are: 62 50 80 a2 81 01 40 c0 a0 63 82 83 a0 6c 50 80 a2 84 02 40 c0 a0 4 0 d1 00 64 02 85 65 20 86 87 88 40 b0 89 69 00 00 8a 68 8b 8c 66 00 00 00 01 06 fa 09 8d b2 71 c2 b5 00 00 09 12 8e 8f 8e 01 3a 09 12 d3 90 05 ab 91 ac 92 ad 93 ae 94 af 95

Invite (flags 0x50): tzhou08 ptt.sprintpcs.com68.24.66.85 Bad Extension tok1/com
.sprintpcs.com/1
Via: 68.28.83.82 a.3ltd5usNcLN8qjYcifhQ~~77 1/com.sprintpcs.com/1
Record-Route (flags 0x50): tzhou08 ptt.sprintpcs.com68.28.82.30 |0240|tok1/com.s
printpcs.com/1?40?lr?00?
To (flags 0x02): 9135689767
From (flags 0x20): ccook02 ptt.sprintpcs.com@ 1126038019 ?40?mdn 8163059757
Contact (flags 0x00): ?00?10.25.40.52
Call-ID: 239236663-10521616341570 192.168.0.120
Cseq: 1 method INVITE 500
502

FIG. 5

```
%method = (
        '00'    =>      "Response ",
        '01'    =>      "Unknown method ",
        '02'    =>      "ACK ",
        '03'    =>      "BYE ",
        '04'    =>      "CANCEL ",
        '05'    =>      "INFO ",
        '06'    =>      "INVITE ",
        '07'    =>      "MESSAGE ",
        '08'    =>      "NOTIFY ",
        '09'    =>      "OPTIONS ",
        '0a'    =>      "PRACK ",
        '0b'    =>      "PUBLISH ",
        '0c'    =>      "REFER ",
        '0d'    =>      "REGISTER ",
        '0e'    =>      "SUBSCRIBE ",
        '0f'    =>      "UPDATE ",
); # %method %tokens = (
        '01'    =>      sub { our $token_index;
                              return defined $sipdictionary1{$sipdata[++$token_index]}
                                ? $sipdictionary1{$sipdata[$token_index]}
                                : "|01$sipdata[$token_index]|"; },
        '02'    =>      sub { our $token_index;
                              return defined $sipdictionary2{$sipdata[++$token_index]}
                                ? $sipdictionary2{$sipdata[$token_index]}
                                : "|02$sipdata[$token_index]|"; },
        '04'    =>      sub { our $token_index;  # Indexed access to the string table.
                              my $string = hex $sipdata[++$token_index];
                              return $string_table[$string]; },
        '05'    =>      sub { our $token_index;
                              my $byte1 = hex $sipdata[++$token_index];
                              my $byte2 = hex $sipdata[++$token_index];
                              my $number = ($byte1 << 8) + $byte2;
                              return "$number "; },
        '06'    =>      sub { our $token_index;
```

FIG. 7A

```
            my $byte1 = hex $sipdata[++$token_index];
                                      my $byte2 = hex
$sipdata[++$token_index];
                                      my $byte3 = hex
$sipdata[++$token_index];
                                      my $byte4 = hex
$sipdata[++$token_index];
                                      my $number = ($byte1 << 24) +
($byte2 << 16) + ($byte3 << 8) + $byte4;
                                      return "$number"; },
            '0c'    =>    "\n",    # CRLF token.
            '0f'    =>    sub { our $token_index;        # Hex String
Token.
                                      my $length = hex
$sipdata[++$token_index];
                                      my $firstchar = $token_index + 1;
                                      my $lastchar = $token_index +
$length;
                                      $token_index += $length + 1;
                                      return
@sipdata[$firstchar..$lastchar];
                                      }, '09'    =>    "\n",    # header start using unknown header.
            '60'    =>    sub { our $token_index;
                                      return "\nGeneric Request:
$method{$sipdata[++$token_index]} URI encoding
0x$sipdata[++$token_index] "; },
            '61'    =>    sub { our $token_index;
                                      my $status_high =
hex($sipdata[++$token_index]);
                                      my $status_low =
hex($sipdata[++$token_index]);
                                      my $status = ($status_high << 8) +
$status_low;
                                      return "\nGeneric Response:
$status "; },
            '62'    =>    sub { our $token_index; return "\nInvite (flags
0x$sipdata[++$token_index]): "; },
            '63'    =>    "\nVia: ",
            '64'    =>    sub { our $token_index; return "\nTo (flags
0x$sipdata[++$token_index]): "; },
            '65'    =>    sub { our $token_index; return "\nFrom (flags
0x$sipdata[++$token_index]): "; },
)
```

METHOD AND SYSTEM FOR DECODING TOKENIZED SESSION INITIATED PROTOCOL PACKETS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to the field of computer software. More particularly, the invention relates to a method and system for decoding tokenized session initiated protocol packets.

BACKGROUND OF THE INVENTION

Session Initiated Protocol (SIP) is a signaling protocol for Internet-type conferencing, telephoning and instant messaging. SIP provides the basic elements of telephony such as call setup, call termination, call configuration and data transfer. SIP has recently been used to route wireless communications using Internet-type networks.

With reference to FIG. 1, a wireless communication device 102 communicates with a server 104, which in turn communicates with a server 106 and another wireless communication device 108. One form of communication between the wireless communication devices 102 and 108 and the servers 104, 106 uses SIP. SIP uses tags and words to properly route the communication. The tags and words of SIP take up a lot of bandwidth and sometimes cause a slow connection.

To speed up the transfer of SIP, a tokenized version of the SIP was developed. Instead of including long tags and words, the tokenized SIP comprises small tokens representing the tags and words. As such, the information communicated from the communication devices 102 and 108, can be communicated to the servers 104 and 106 quickly. One exemplary version tokenized SIP is used with two-way walkie-talkie style communications such as SPRINT PCS READYLINK.

However, sometimes errors occur when using tokenized session initiated protocol to connect wireless communication devices. It is difficult to determine where errors are occurring (e.g., at the communications device level or the server level) or why connections are not being made. Because tokens stand for tags and words, it is difficult to decipher the tokenized version of the session-initiated protocol. There also are not any sniffers to decode tokenized SIP. And while sniffers exist to decode SIP, no sniffers exist to decode tokenized SIP.

Therefore, it would be beneficial to have a method and system for decoding tokenized SIP into regular SIP to decipher and determine where errors may be occurring.

SUMMARY OF THE INVENTION

In one embodiment, a method of decoding tokenized Session Initiated Protocol, is described. A first token from a Session Initiated Protocol packet is received. A decoding table is accessed and the corresponding entry in the decoding table is determined for the first token. The corresponding entry is then executed to decode the first token. Additionally, some or all of the tokens in a tokenize Session Initiated Protocol packet may decoded in by accessing a decoding table, determining the corresponding entry in the decoding table and executing the entry for each token.

In another embodiment, the present invention relates to a method for providing decoded tokenized Session Initiated Protocol. A request for one or more tokenized Session Initiated Protocol packets to be decoded is received and the decoded tokenized Session Initiated Protocol packet is provided.

BRIEF DESCRIPTION OF THE SEVERAL VIEWS OF THE DRAWINGS

The present invention is described in detail below with reference to the attached drawing figures, wherein:

FIG. 4 is an exemplary screenshot of a tokenized SIP packet in accordance with an embodiment of the present invention;

FIG. 5 is an exemplary screenshot of tokens and a decoded tokenized SIP packet in accordance with an embodiment of the present invention;

FIG. 6 is an exemplary string table index to be used in accordance with an embodiment of the present invention; and FIGS. 7A and 7B are an exemplary decoding tables to be used in accordance with an embodiment of the present invention.

DETAILED DESCRIPTION OF THE INVENTION

Figure 1:
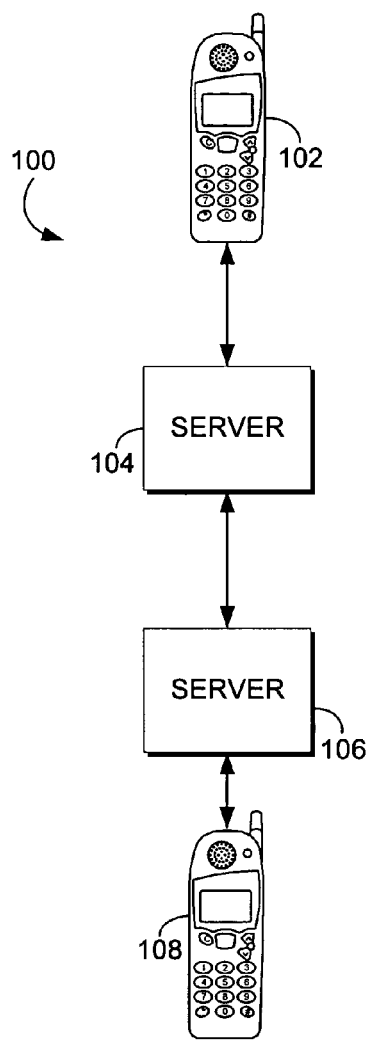
FIG. 1 is a block diagram of an exemplary environment suitable for using tokenized session initiated protocol.

The present invention provides a system and method for decoding tokenized session initiated protocol (SIP) packets. With reference to FIG. 1, an exemplary system 100 for implementing the present invention is shown. Tokenized SIP is used as the signaling protocol with the exemplary system 100. The components of the system 100 include telecommunication devices 102 and 108, such as wireless phones, PDAs and other wireless communication devices. The system also includes servers 104, 106 for routing communications from device 102 to device 108 and vice-versa. The servers 104, 106 are capable of supporting an Internet type network to route communications between the communication devices 102 and 108.

As the tokenized SIP packets are transferred through the system 100, copies of tokenized SIP packets are collected and stored in a database to be decoded. In one instance, all tokenized SIP packets from a call that could not complete successfully are stored in a database to be decoded. The decoded tokenized SIP message helps to determine where errors or slowdowns may be occurring.

Figure 2:
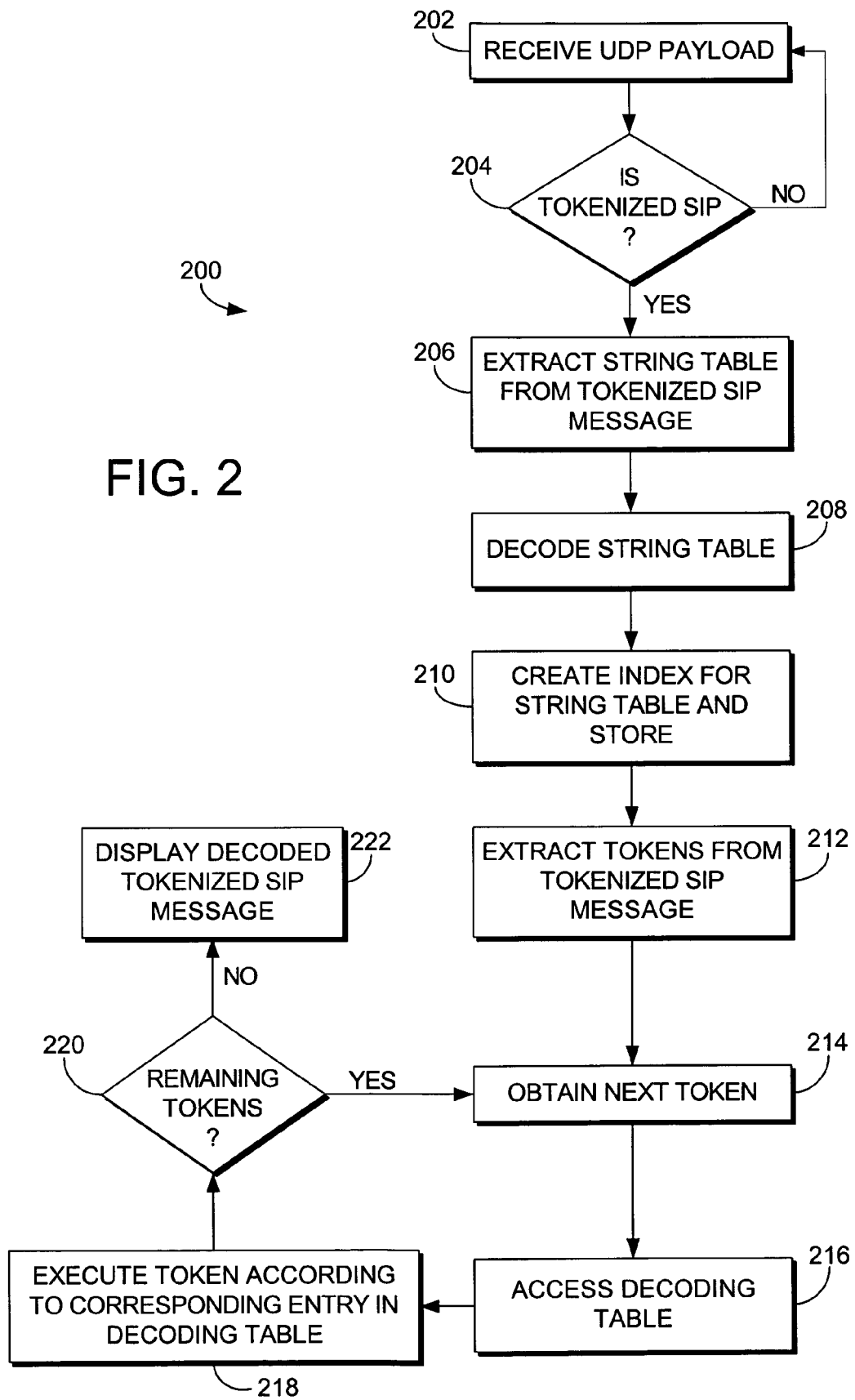
FIG. 2 is a flow diagram of a method and system for decoding tokenized session initiated packets in accordance with an embodiment of the present invention.

Referring next to FIG. 2, a method for decoding tokenized SIP packets 200 is shown. An exemplary tokenized SIP packet 400 is shown in FIG. 4. Tokens may be represented by any textual element or combination of textual elements, such as numbers, symbols and/or letters. A variety of applications can be used to decode tokenized SIP packets, including a PERL application. Referring again to FIG. 2, at step 202, a payload is received. In this embodiment, the payload is a User Datagram Protocol (UDP). However, the tokenized SIP may be carried over any variety of protocols. At block 204, it is determined whether the UDP payload is a tokenized SIP packet. For instance, the payload may be identified in the UDP layer of the payload as tokenized SIP or may have a recognizable structure identifying it as tokenized SIP distinguishing it from other types of packets. If the payload is not a tokenized SIP packet, the system returns to step 202 and receives another payload.

If at block 204 the system determines that the payload is tokenized SIP, then at step 206 a string table is extracted from the tokenized SIP packet The string table includes information that could not be tokenized into tokenized SIP. At step 208, the string table is decoded. In step 210, the system creates an index for the string table and stores the index for later use. Each string table entry in the index has a corresponding value that may include call setup, call termination and call configuration information that cannot be tokenized. This information may include the server's Internet Protocol address and call destination phone numbers. An exemplary string table index 600 is shown in FIG. 6. In the exemplary string table, there are string table entries 0-14. Each entry has a corresponding value in quotes. For example, string table entry 1 has a value of 68.28.83.82.

Referring again to FIG. 2, at step 212, the token set to be decoded is extracted from a layer of the tokenized SIP packet. An exemplary token set 500 is shown in FIG. 500. Referring again to FIG. 2, at step 214 the system receives the next token to be decoded. At step 216, the system accesses a decoding table. The exemplary decoding table is a hash table, a look-up table, or any other table or database providing the capability to decode tokens. A hash table includes the value for the location of the corresponding data in a structure for the token.

An exemplary decoding table is shown below in FIGS. 7A and 7B. In the exemplary decoding table, each token has a corresponding entry. The corresponding entry may be a subroutine to be performed; call setup and termination information, call configuration and data transfer information or combinations thereof. Subroutines may require receiving the next token from the token set, keeping track of the next token in the token set, accessing a token dictionary for a value or entry and accessing the string table index. One of skill in the art will appreciate that the corresponding entries may be any variety of information that can be used to decode tokenized SIP. The entries in the exemplary table in FIGS. 7A and 7B are for decoding each token into its non-tokenized SIP format 502 as shown in FIG. 5.

Referring again to FIG. 2, step 218, the token is executed according to the corresponding entry in the decoding table. For example, the entry for the first token, 62, is determined from a decoding table. It is determined that token 62 is exemplary for an invitation. The entry for token 62 also includes receiving the next token, token 50. After the token has been executed, at step 220, it is determined whether there are any remaining tokens in the tokenized SIP packet. If so, the system returns to step 214 and receiving the next token. If there are no remaining tokens, the system proceeds to step 222 and provides the decoded tokenized SIP packet with all of the decoded tokens entries for each token in the packet. An exemplary decoded tokenized SIP packet 502 is shown in FIG. 5. In one instance the decoded tokenized SIP packet is provided by being displayed to a user.

Figure 3:
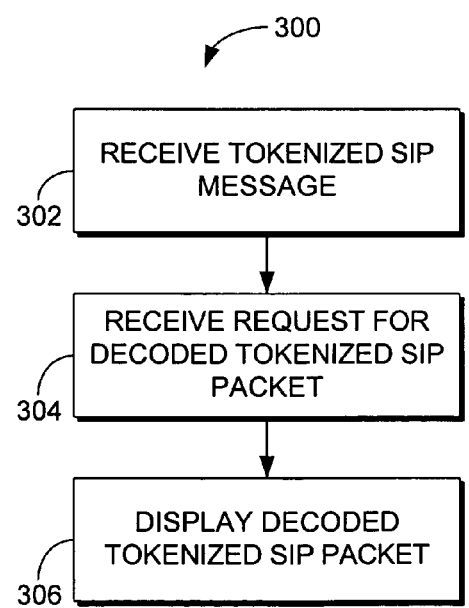
FIG. 3 is a flow diagram of a method for providing decoded tokenized session initiated protocol packets in accordance with an embodiment of the present invention.

With reference to FIG. 3, a method for providing tokenized SIP messages 300 is shown. At step 302, a tokenized SIP packet is received. At step 304, a request for the tokenized SIP packet to be decoded is received. At step 306, the system provides the decoded tokenized SIP packet. An exemplary decoded tokenized SIP packet is shown in FIG. 5. The decoded packet makes it easier to determine where errors are occurring. For example, from the tokenized SIP packet shown in FIG. 4, it is not clear where the error in the transmission of the packet is occurring. However, in the decoded packet 502 shown in FIG. 5 it shows that there is a bad extension.

By way of example and not by limitation, the following is an example of decoding a tokenized SIP packet. Referring to FIG. 2, at step 202 a payload is received. The exemplary payload 400 is shown in FIG. 4. At step 204 of FIG. 2, it is determined that the payload is tokenized SIP. At steps 206, 208 and 210, the system extracts a string table is extracted from the tokenized SIP packet, decoded and stored as an index. The exemplary string table for the tokenized SIP packet of FIG. 4 is shown in FIG. 600. At step 212, the tokens are extracted from the tokenized SIP packet. The token set is extracted from the tokenized SIP packet and is shown in FIG. 5.

At step 214 of FIG. 2, the first token of the of the token set is received and a decoding table is accessed at step 216. The exemplary decoding table is shown in FIGS. 7A and 7B. At step 218 the token is executed according to its corresponding entry in the decoding table. The corresponding entry for token 62 is shown in FIG. 7B and is: sub [our $token_index; return "/nInvite (flags0x$sipdata[++$token_index]):";}. The corresponding entry for token 62 is executed. The execution of the entry for token 62 requires that the next token, which is 50 be received and included in the decoded message. As such, token 62 is decoded as Invite (flags 0x50). The decoded token can be seen as part of the decoded packet in 502 in FIG. 5.

Then at step 220 it is determined that there are remaining tokens in the token set and at step 214 the next token, token 80, is received. Once all of the tokens have been decoded the decoded tokenized SIP packet is displayed.

In summary a method of decoding tokenized Session Initiated Protocol is described where tokens from tokenized SIP are received. A decoding table is accessed and the corresponding entry for the token is determined. The tokens are executed according to the corresponding entry for each token. Once the tokens have been executed according to their entries in a decoding table, the decoded tokenized Session Initiated Protocol packet is displayed.

Although the invention has been described with reference to the embodiment of the invention and the attached drawing figures, it is noted that substitutions may be made in equivalents and employed herein without departing from the scope of the invention as recited in the claims. For example, additional steps may be added or admitted without departing from the scope of the invention.

The invention claimed is:

1. A method of decoding tokenized Session Initiated Protocol, the method comprising:

collecting, at a server, a plurality of tokenized Session Initiated Protocol packets from calls that are not successfully completed;

receiving, at the server, a first tokenized Session Initiated Protocol packet from the plurality of tokenized Session Initiated Protocol packets;

extracting, at the server, a string table from a user datagram payload in the first tokenized Session Initiated Protocol packet;

decoding, at the server, the string table from the user datagram payload;

creating, at the server, an index for the string table, wherein the index includes an IP address for a server that generated the first tokenized Session Initiated Protocol packet;

storing, at the server, the index for the string table;

accessing, at the server, a decoding table;

determining, at the server, a corresponding entry in the decoding table for each token in the first tokenized Session Initiated Protocol packet;

executing, at the server, the corresponding entry for the each token to decode the first tokenized Session Initiated Protocol packet; and displaying, through a user interface communicatively coupled to the server, the decoded first tokenized Session Initiated Protocol packet on a display device as a Session Initiated Protocol message, thereby allowing an evaluation of the Session Initiated Protocol message to determine what caused a call to not be successfully completed.

2. The method of claim 1, wherein executing the corresponding entry decodes the each token into Session Initiated Protocol element.

3. The method of claim 1, wherein said each token is a textual element representing a Session Initiated Protocol element.

4. The method of claim 1, further comprising:
receiving, at the server, a user datagram payload.

5. The method of claim 4, further comprising:
determining, at the server, whether the user datagram payload is tokenized Session Initiated Protocol.

6. The method of claim 1, further comprising:
storing, at the server, the index for the string table.

7. The method of claim 1, wherein the corresponding entry for the each token to decode is a subroutine.

8. The method of claim 7, wherein the subroutine includes one of receiving a next token, accessing a token dictionary, accessing a string table or combinations thereof.

9. A method for providing decoded tokenized Session Initiated Protocol packets for review, the method comprising:
collecting, at a server, a plurality of tokenized Session Initiated Protocol packets from calls that are not successfully completed;

receiving, at the server, a request for a first tokenized Session Initiated Protocol packet from the plurality of tokenized Session Initiated Protocol packets to be decoded;

receiving, at the server, a first token from the first tokenized Session Initiated Protocol packet;

extracting, at the server, a string table from a user datagram payload in the first tokenized Session Initiated Protocol packet;

decoding, at the server, the string table from the user datagram payload;

creating, at the server, an index for the string table, wherein the index includes attribute values describing a server that generated the first tokenized Session Initiated Protocol packet;

storing, at the server, the index for the string table;

accessing, at the server, a decoding table;

determining, at the server, a corresponding entry in the decoding table for the first token;

executing, at the server, the corresponding entry to decode the first token; and displaying, through a user interface communicatively coupled to the server, the decoded tokenized Session Initiated Protocol packet, thereby allowing an evaluation of the Session Initiated Protocol message to determine what caused a call to not be successfully completed.

10. The method of claim 9, further comprising:
receiving, at the server, a second token from the tokenized Session Initiated Protocol packet;

accessing, at the server, the decoding table;

determining, at the server, the corresponding entry in the decoding table for the second token; and executing, at the server, the corresponding entry to decode the second token.

* * * * *

UNITED STATES PATENT AND TRADEMARK OFFICE
CERTIFICATE OF CORRECTION

PATENT NO. : 7,630,319 B1  Page 1 of 1
APPLICATION NO. : 10/881984
DATED : December 8, 2009
INVENTOR(S) : Joel Mark Studtmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Second Day of November, 2010

David J. Kappos
*Director of the United States Patent and Trademark Office*